US006733093B2

United States Patent
Deland et al.

(10) Patent No.: US 6,733,093 B2
(45) Date of Patent: May 11, 2004

(54) SPLIT WHEEL AND METHOD FOR INSTALLING ENDLESS TRACK

(75) Inventors: André Deland, Drummondville (CA); Marc Delisle, Drummondville (CA)

(73) Assignee: Soucy International Inc., Drummonville (CA)

( * ) Notice: Subject to any disclaimer, the term of this patent is extended or adjusted under 35 U.S.C. 154(b) by 0 days.

(21) Appl. No.: 10/202,391

(22) Filed: Jul. 25, 2002

(65) Prior Publication Data

US 2004/0017109 A1 Jan. 29, 2004

(51) Int. Cl.[7] .............................................. B62D 55/12
(52) U.S. Cl. ........................ 305/199; 305/125; 305/136; 474/95
(58) Field of Search ................................ 305/136, 137, 305/195, 199, 125, 165, 60; 474/152, 158, 160, 95, 96; 301/36.1, 30, 31; 180/9.1, 9.28, 9.3

(56) References Cited

U.S. PATENT DOCUMENTS

| | | | |
|---|---|---|---|
| 1,856,068 A | * | 5/1932 | Christie |
| 2,466,068 A | * | 4/1949 | Archer ......................... 474/95 |
| 3,083,585 A | * | 4/1963 | Dawe et al. .................. 474/96 |
| 3,106,101 A | * | 10/1963 | Kolanowski et al. ......... 474/96 |
| 3,937,528 A | * | 2/1976 | Clemens et al. ............ 305/199 |
| 4,257,653 A | * | 3/1981 | Meisel, Jr. et al. |
| 4,458,955 A | * | 7/1984 | Webb |
| 4,538,860 A | * | 9/1985 | Edwards et al. |
| 4,631,974 A | | 12/1986 | Wiegand et al. |
| 4,798,418 A | * | 1/1989 | Kempf et al. .................. 301/31 |
| 4,818,041 A | * | 4/1989 | Oertley ........................ 305/137 |
| 4,923,257 A | * | 5/1990 | Purcell |
| 5,080,852 A | | 1/1992 | Hertel et al. |
| 5,190,363 A | * | 3/1993 | Brittain et al. |
| 5,246,246 A | | 9/1993 | Kendall |
| 5,368,115 A | * | 11/1994 | Crabb ......................... 180/9.1 |
| 5,393,134 A | * | 2/1995 | Oertley ........................ 305/199 |
| 5,833,562 A | * | 11/1998 | Walker, Sr. ................... 474/96 |
| 5,868,036 A | | 2/1999 | Salzman |
| 6,129,426 A | * | 10/2000 | Tucker ........................ 305/136 |
| 6,386,653 B1 | * | 5/2002 | Brandenburger ............ 305/116 |
| 6,497,460 B2 | * | 12/2002 | Lemke et al. ............... 305/132 |

FOREIGN PATENT DOCUMENTS

EP 149160 * 12/1984

* cited by examiner

Primary Examiner—Russell D. Stormer
(74) Attorney, Agent, or Firm—Robert Brouillette; Ronald S. Kosie; Gaetan Prince

(57) ABSTRACT

This invention relates to endless tracks and systems used to propel tracked vehicles [i.e., vehicles which use endless tracks rather than tires to contact the terrain over which they are driven, e.g., tractors, tanks, bulldozers, etc.] and, more particularly, to an improved split wheel design and installation process therefore. The track is made from a polymer adapted to travel over a drive sprocket, a plurality of guide wheels and a tension wheel. A new step by step methodology allows the endless track to be installed and used more efficiently when the tension wheel or the drive sprocket is replaced by a split wheel.

16 Claims, 15 Drawing Sheets

SPLIT WHEEL AND METHOD FOR INSTALLING ENDLESS TRACK

FIELD OF THE INVENTION

This invention relates to endless tracks used to propel tracked vehicles [i.e., vehicles which use endless tracks rather than tires to contact the terrain over which they are driven, e.g., tractors, tanks, bulldozers, etc.] and, more particularly, to one split wheel which allows for easier and more efficient method of installing the endless track on a tracked vehicle.

BACKGROUND OF THE INVENTION

[NOTE: As used herein, the term "rubber" relates to any elastic and primarily non-metallic materials such as rubber, elastomers, or combinations thereof used in the manufacture of endless tracks].

Numerous types of vehicles are frequently used in terrain in which it is difficult for pneumatic tires to operate. Both defense vehicles, such as tanks and amphibious vehicles, and civilian vehicles, such as tractors and recreational vehicles, are sometime utilized on terrains which are very soft, for example sand surfaces. Pneumatic tires are not capable of efficient operation on such soft surfaces, as they tend to burrow into the surface, rather than riding across the surface.

In the past the most popular type of track for heavy duty vehicles have been metallic tracks. However, these metallic tracks still present significant inconveniences in relation to wheeled vehicle. Some of these problems can be summarized as follows:

Noise. The metallic track produces an excessively high level of noise. This fact can cause a significant strategic disadvantage when used in association with defense vehicles since the enemy can detect their presence many miles away.

Damage. With respect to civilian vehicles equipped with such tracks or defense vehicles used in peace keeping missions, the metallic tracks can cause significant damage to the ground surface whether it be paved or not.

Weight. Metallic tracks are very heavy. For example the, typical weight of a metallic track used on an M113 vehicle is 1200 pounds while metallic tracks used on a fighting vehicle can be above 2500 pounds. Such a weight is both an inconvenience with respect to the mobility of the vehicles and with respect to their consumption of fuel.

Short lifespan. Metallic tracks have a short lifespan. Even metallic tracks provided with rubber pads wear out extremely rapidly such that the pads need to be replaced typically every 500 to 1000 miles on a defense tank.

Maintenance. Metallic tracks also require a lot of maintenance. The replacement of the rubber pads, the metallic links or pivots, etc. require a continuous maintenance of the tracks.

Costs. Finally, the cost of manufacturing, maintenance and refurbishing are extremely high.

Recently, endless rubber tracks have become popular because of an increase in construction. With the combination of rubber technology and a tremendous amount of trial and error, various types of rubber tracks are now available in the industry. They are used on defense vehicle, excavators, dump carriers, boring machines, combines, tractors, and the like.

While rubber endless tracks are often desirable since they reduce damage to the terrain, reduce noise and allow access to various types of soil, they do have some drawbacks concerning their installation and removal. Usually, once installed the track is carried and maintained in tension by a plurality of rotating elements (wheels, sprockets, etc . . . ) that are connected to the vehicle. The tracks being maintained in circumferential contact with these rotating elements are being driven thereby (or, in the case of trailer-like non-driven vehicles, being supported for rotation thereon).

Metallic tracks which are often formed by a number of individual pieces fastened together can be separated into a single strip thus allowing installation onto the plurality of rotating elements. This method has been in place for many years.

Rubber tracks on the other hand are usually formed of a single continuous piece, and it is typically difficult and may require special equipment to mount them around the plurality of rotating elements, or remove them when maintenance or access is needed on the vehicle. This is especially true with tracks for heavy duty vehicles where the tracks can weigh a substantial amount.

As rubber tracks have grown more popular it has become apparent that the best way of installing a new track involves the removal of one or more of the wheels or other rotating elements from the vehicle. While the removal of the wheel rotating elements allows the track to be slid around the drive assembly with more ease, reinstalling the wheel rotating elements still may pose problems.

The present invention sets out to solve the problem of installing or removing a rubber endless track by providing a special wheel (tension wheel, sprocket wheel, etc . . . ) which is split into sections (when viewed from the side). The parts may be installed separately and will form a complete tension wheel when fully installed.

The idea of splitting a wheel into multiple pieces is not new, though it has not previously been adapted for use with endless track installation.

Previous split wheel assemblies can be found in U.S. Pat. Nos. 4,631,974 (Weigland et al.), 5,080,852 (Hertel et al.), and 5,868,036 (Salzman).

U.S. Pat. No. 4,631,974 Weigland et al. describes a split sprocket wheel for applications which are either submerged or in a corrosive environment. The wheel of the Weigland patent is made up of two portions of a circular wheel. During installation the two pieces of the wheel are put around a drive shaft and fastened together by multiple means, such as a circular band clamp and a plurality of wedge dog assemblies. U.S. Pat. No. 5,080,852 Hertel et al. describes a method for making a bearing sleeve for a split sprocket wheel assembly such as the one described in the Weigland patent.

U.S. Pat. No. 5,868,036 Salzman describes a split transfer wheel which is used to impart movement to other materials. The wheel comprises two wheel halves which are held together by multiple bolts. The construction of the wheel allowing for a strip of a tire material to be held in place around the wheel, and said strip of tire material being replaced if worn out.

While the above split wheels are useful in their own areas, the construction of the wheels unfortunately do not allow them to be useful in the field of endless track installation. The reason for this is that the wheels of the Salzman and the Weigland patents need to be fully assembled to function. For the installation of endless tracks it is useful to have a split wheel which allows for one portion of the wheel to be installed and function without the other portion of the wheel being installed.

SUMMARY OF THE INVENTION

The objective of this invention is to provide a workable solution to the rubber endless track installation problems, since such a track is mostly made from one single continuous rubber part, thus requiring special tools or equipment at installation. The rubber endless track had originally been invented as a compromise to metal tracks, proposing a wider range of commercial and residential applications for a tracked vehicle, with a lower cost and at a lower weight.

With the increase in popularity for such a rubber track came the necessity to provide the means for an easier installation process, since the track installation, removal and the maintenance procedures can sometimes be required in a variety of environments, or in remote and/or inconvenient locations.

The invention provides a step by step method of installation of an endless rubber track on a vehicle using a split wheel which replaces the tension wheel or the drive sprocket on the typical tracked vehicle configuration.

There is therefore provided a split wheel for use with an endless track, comprising:
  a first section defining an angular portion of the circumference of said wheel and
  a second section defining another angular portion of said circumference;
said first section and said second section being configured such that said first section may be fastened to a supporting shaft separately from the second section.

In another embodiment, a split wheel for use with an endless truck, comprising:
  a first section defining another angular portion of the circumference of said wheel and
  a second section defining another angular portion of said circumference:
  a third section defining still another angular portion of said circumference;
said first section, said second section and said third section being configured such that said first section and said third section may be fastened to a supporting shaft without said second section being fastened to said supporting shaft.

There is also provided a method of installing an endless track on a tracked vehicle equipped with a plurality of wheels and a split wheel, said split wheel comprising:
  a first section which defines an angular portion of the circumference of said split wheel and
  a second section which defines another angular portion of said circumference;
said method comprising the steps of:
  a) insuring said split wheel is removed from the said vehicle;
  b) placing said endless track over said plurality of wheels;
  c) instilling said first section on the vehicle such that said angular portion of the circumference faces away from said endless track;
  d) rotating said first section such that said angular portion of the circumference faces said endless track, to tension said endless track around said plurality of wheels and said first section,
  e) installing said second section on said vehicle.

While the invention method and use of a split wheel is meant to facilitate the installation process of a rubber track on a tracked vehicle, one particular purpose is to lower the cost and reduce the time required to complete the installation or replacement of a rubber track. A simpler method with the use of many standard tools will also benefit to the customer by increasing possibilities of fixing field problems.

Other aspects and many of the attendant advantages will be more readily appreciated as the same becomes better understood by reference to the following detailed description and considered in connection with the accompanying drawings in which like reference symbols designated like elements throughout the figures.

The features of the present invention which are believed to be novel are set forth with particularity in the appended claims.

BRIEF DESCRIPTION OF THE FIGURES

Accordingly it is intended that the foregoing disclosure and showing made in the drawings shall be considered only as an illustration of the principle of the present invention.

DETAILED DESCRIPTION OF A PREFERRED EMBODIMENT

Figure 1:
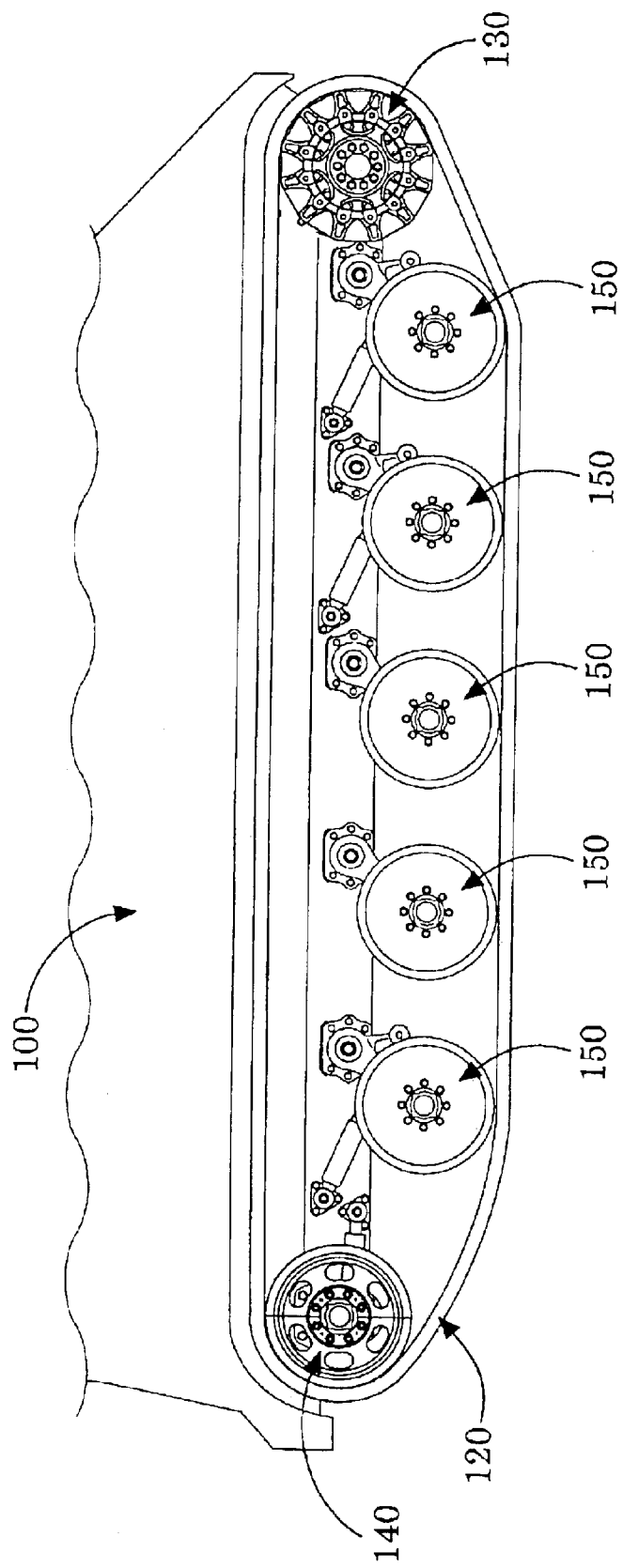
FIG. 1 is a partial side view of a tracked vehicle making use of a split tension wheel in accordance with the invention.

FIG. 1. shows a general side view of a split tension wheel system in accordance with this invention and installed in this embodiment on a defense vehicle 100. The vehicle comprises an endless reinforced rubber track 120, a sprocket drive 130, a split tension wheel 140 and a plurality of road wheels 150 which support the vehicle and guide the track 120. This system is coupled to appropriate drive means (not shown) through an appropriate suspension system (not shown). A similar system is disposed on the other side of the vehicle 100.

Figure 2:
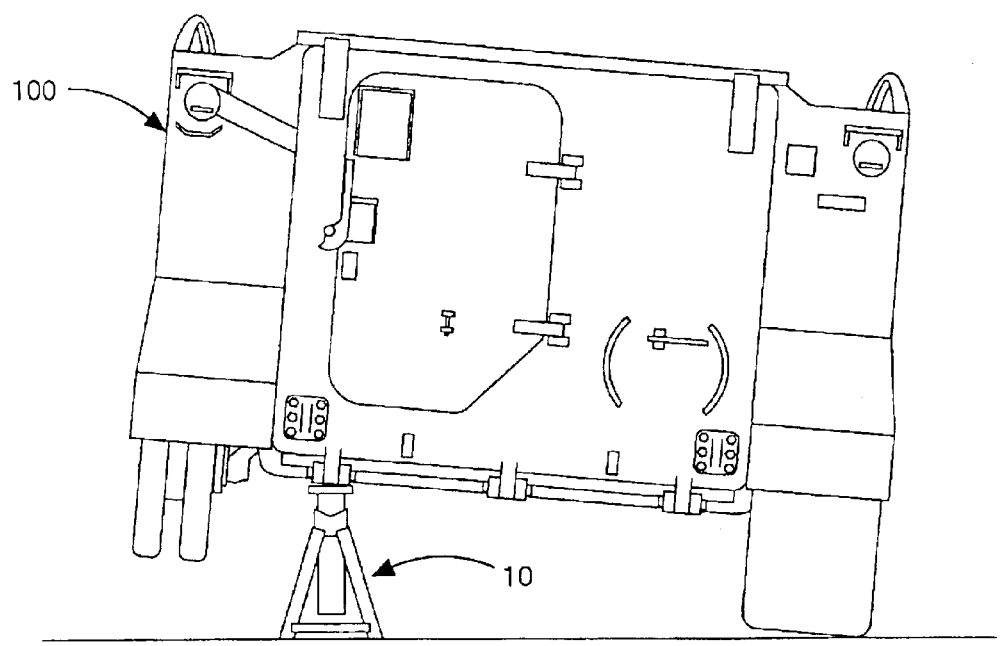
FIG. 2 is a rear view of the vehicle shown in FIG. 1.

Although the method explained herein is described in relation to the installation of an endless track on a vehicle, it is also applicable for the removal of the endless track from the vehicle. As shown in FIG. 2, the vehicle 100 needs to be lifted one side at a time with a typical jacking equipment 10 in order to install the endless rubber track 120 (see FIG. 1).

Figure 3:
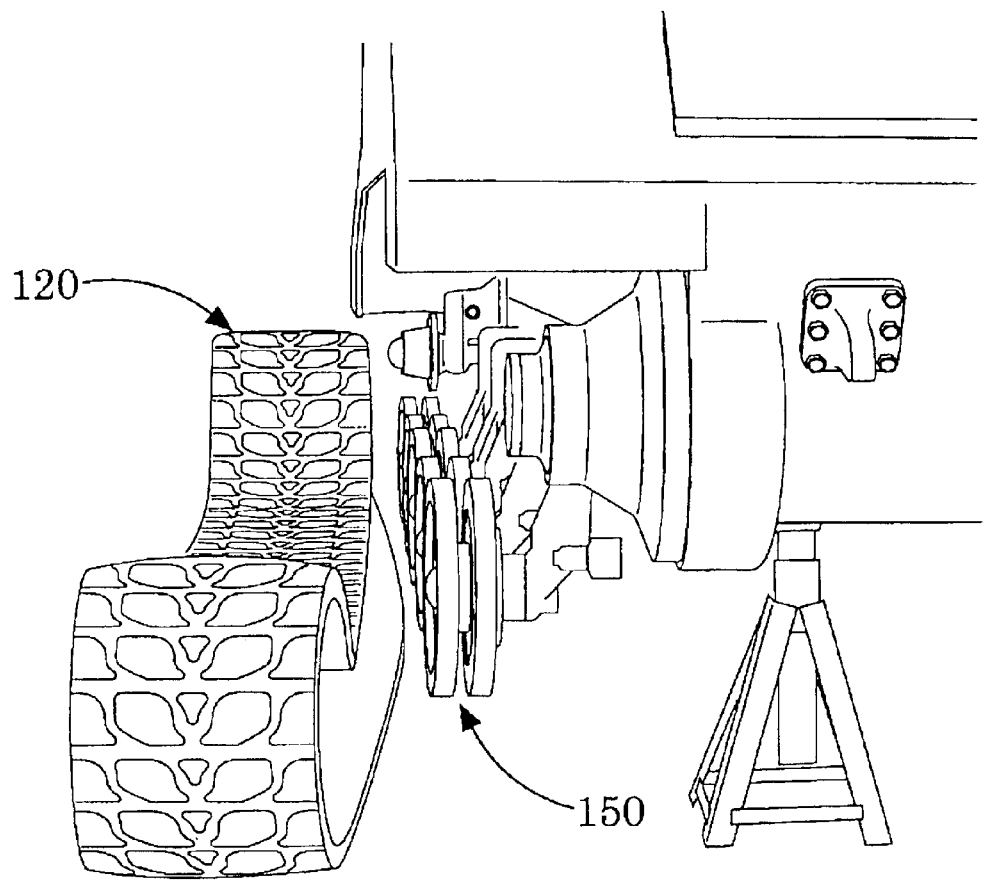
FIG. 3 is a partial rear view showing the endless rubber track alongside the vehicle shown in FIG. 1.

As shown in FIG. 3, the rubber track 120 needs to be laid along the plurality of road wheels 150 in the required direction of operation. The upper portion 121 of the rubber track 120 is lifted and disposed over the plurality of road wheels 150, as shown in FIG. 4, followed by the sliding of the rubber track 120 lower portion 126 under and aligned with the plurality of road wheels 150.

Figure 5:
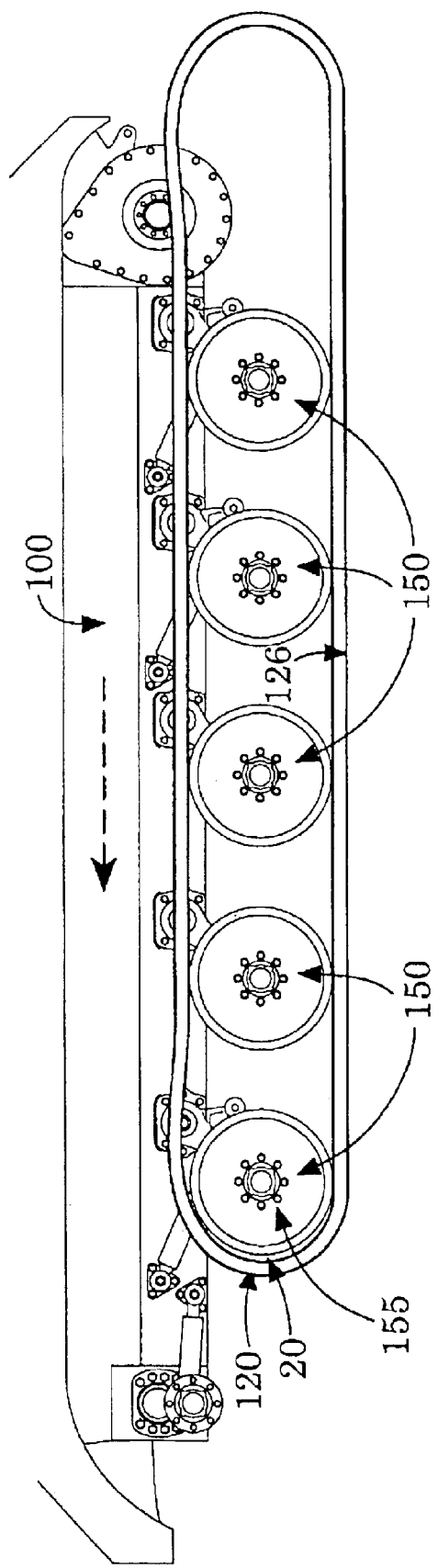
FIG. 5 is a partial side view of the vehicle on which the vehicle has been lowered on the rubber track.

FIG. 5 shows the resulting configuration after the jacking equipment 10 (see FIG. 2) has been removed and the vehicle 100 and its plurality of road wheels 150 have been lowered on the lower portion 126 of the rubber track 120. By hand or by moving the vehicle back, the gap 20 between the endless track 120 and the last road wheel 155 is kept as small as possible.

Figure 4:
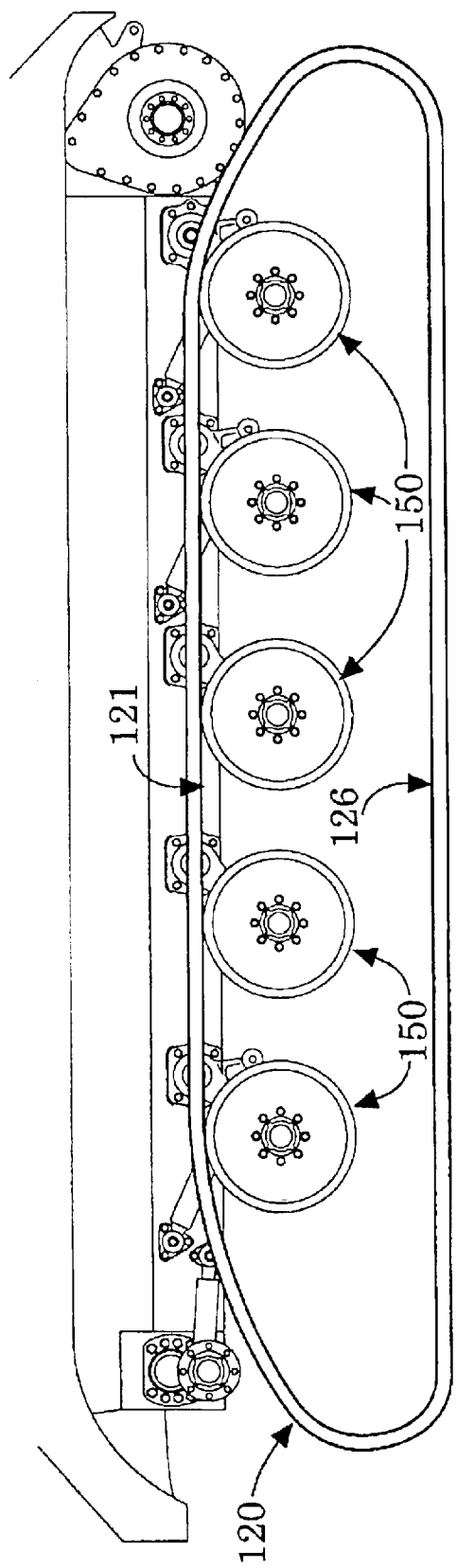
FIG. 4 is a partial side view of the vehicle on which the rubber track has been partially installed.
Figure 6:
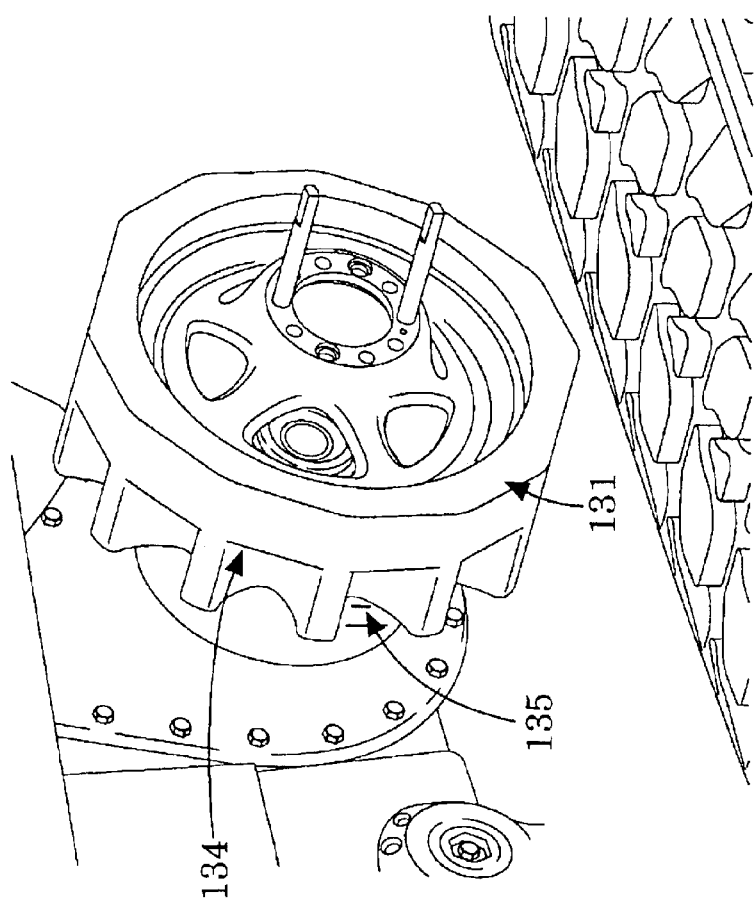
FIG. 6 is a perspective view showing the first half of a drive sprocket being installed on its supporting shaft.
Figure 7:
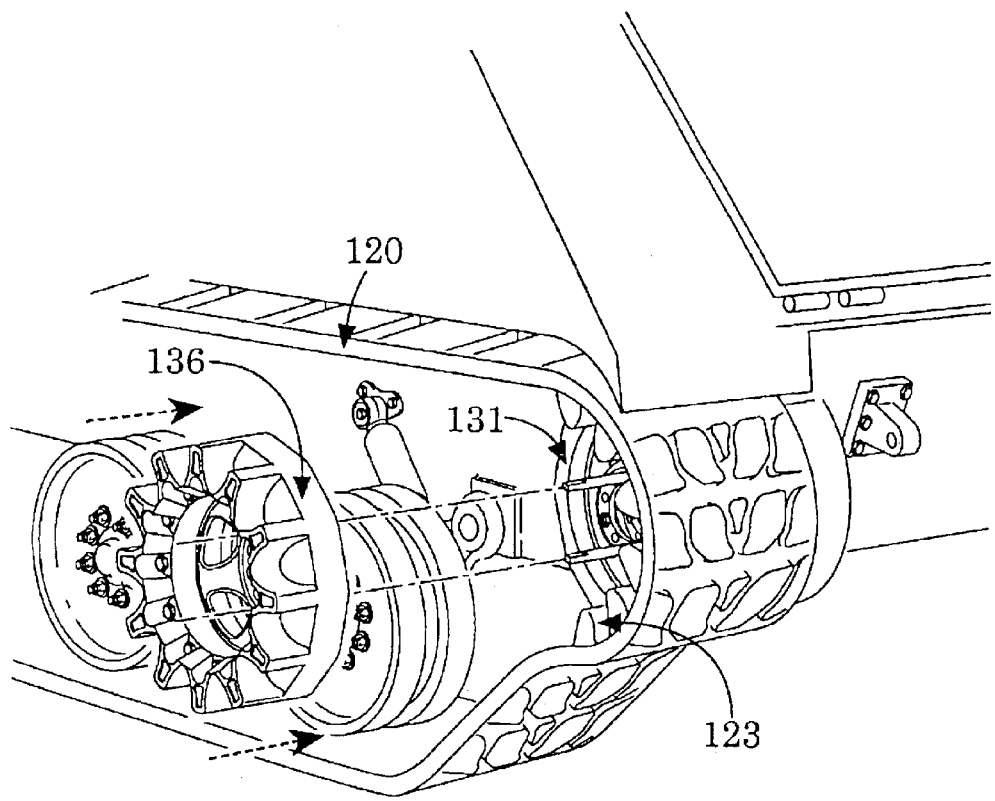
FIG. 7 is a perspective view showing the rubber track being installed on the first half of the drive sprocket.
Figure 8:
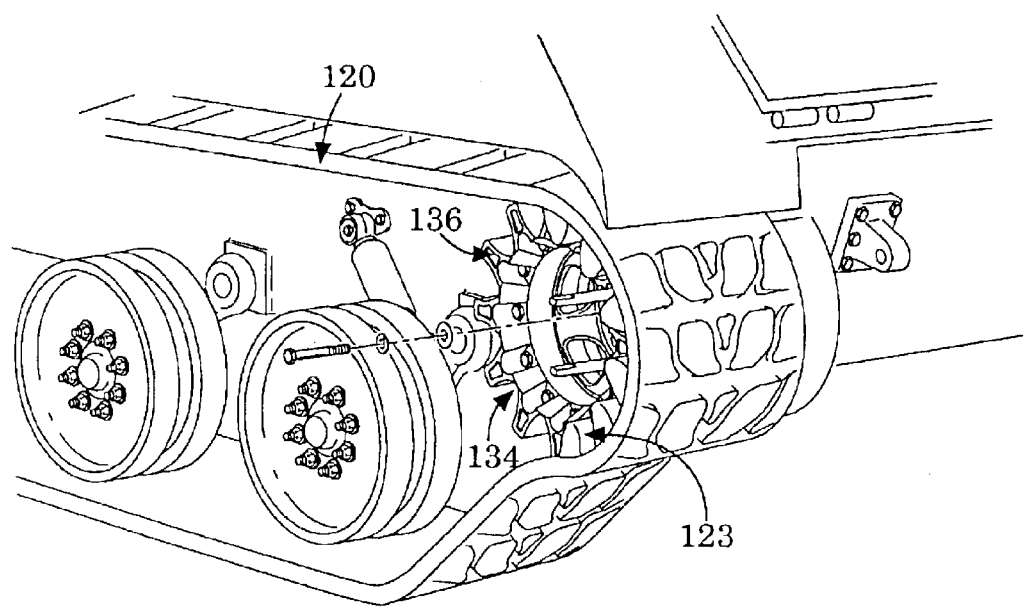
FIG. 8 is a perspective view showing the second half of a drive sprocket being installed with the first half of the drive sprocket and the rubber endless track.

As illustrated in FIG. 6., the inner half 131 of drive sprocket 130 (longitudinal split of the drive sprocket 130) is installed on its shaft hub 135, then becomes available as support for the upper part 121 of the endless tracks 120 (see FIG. 4). FIG. 7 shows how to position the rubber track 120 on top of the inner half 131 of drive sprocket 130 by engaging the rubber track inner lugs (not shown) into the formed gorge 134 of the drive sprocket 130 (see FIG. 6, only one shown). The outer half 136 of drive sprocket 130 is assembled with the inner half 131 of drive sprocket 130 and in conjunction with the rubber track 120, by still having corresponding rubber track lugs 123 (only one shown) inserted in the formed gorge 134 (only one shown) of the outer half 136 of drive sprocket 130, as shown in FIG. 8.

Figure 9:
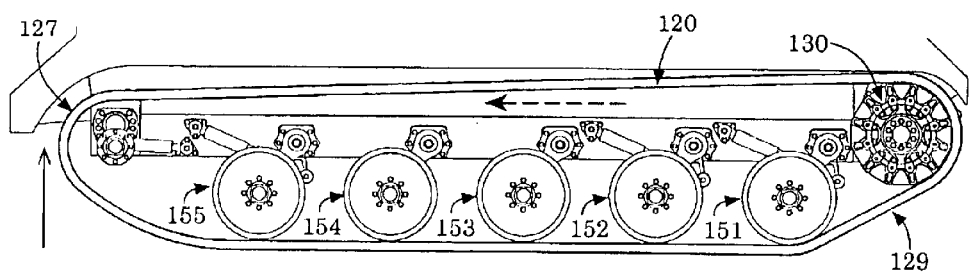
FIG. 9 is a partial side view of a tracked vehicle on which the rubber track gap between the drive sprocket and the first road wheel has been minimized.

As shown in FIG. 9, tension is obtained in segment 129 of the rubber track 120, which is located between first road wheel 151 and drive sprocket 130, with engine power rotating drive sprocket 130 backward, thus providing the maximum rubber track play near its end 127.

Figure 10:
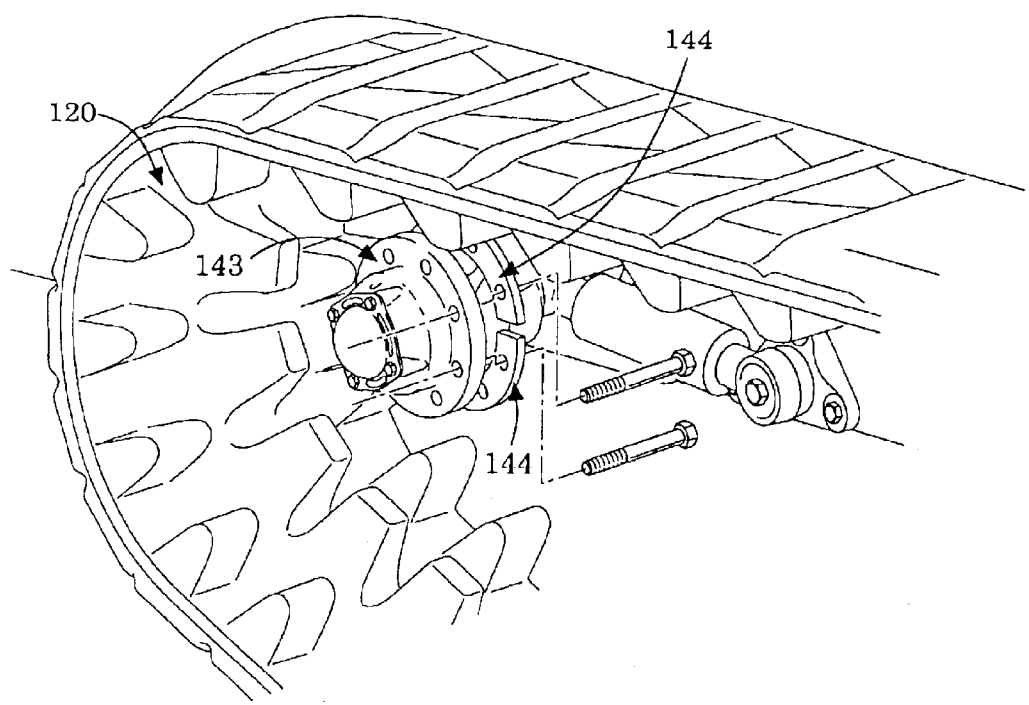
FIG. 10 is a perspective view showing the tension wheel supporting shaft and the rubber track before the installation of the first section of the tension wheel.
Figure 11:
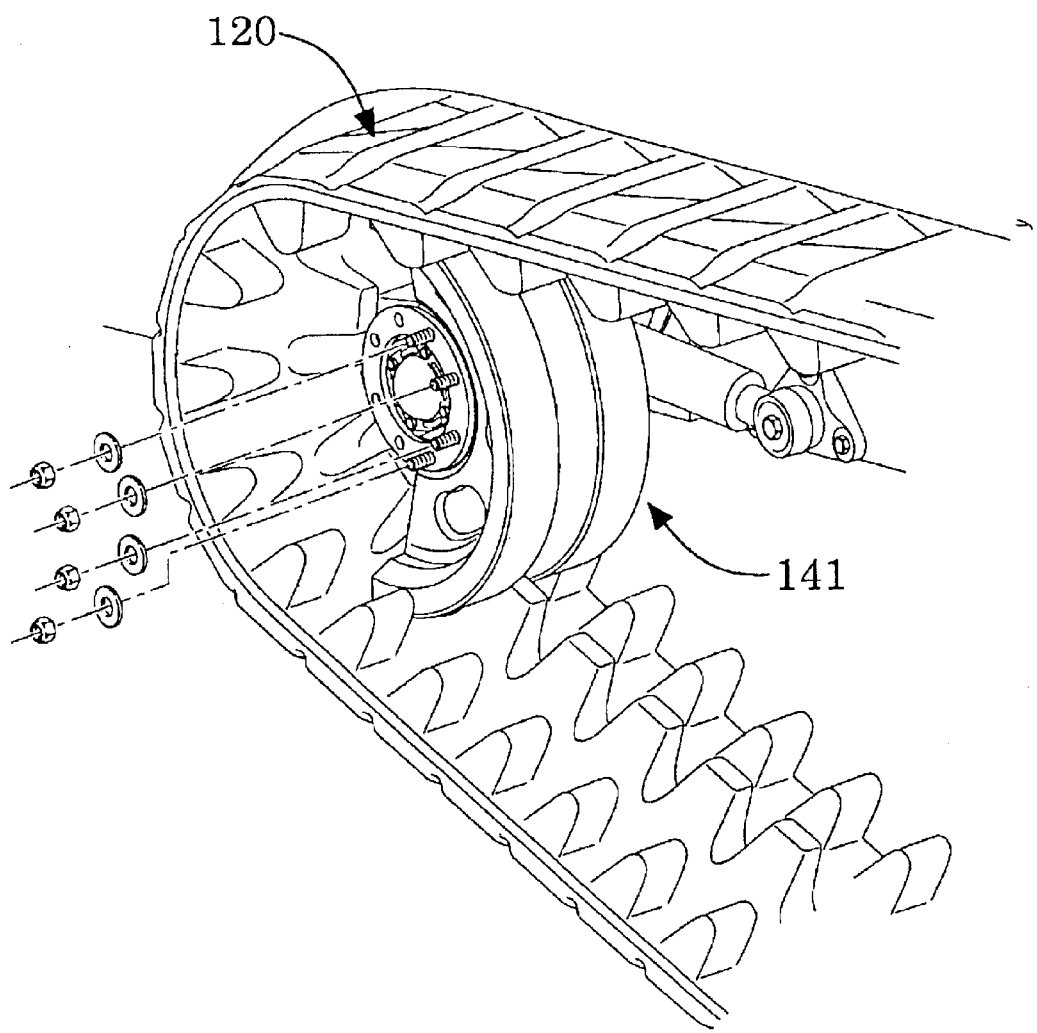
FIG. 11 is a perspective view of the first section of the tension wheel being installed.

FIG. 10 shows that separated rings 144 are positioned on the innermost side of the tension wheel shaft hub 143 in order to provide a clamping device. Once the first half 141 of tension wheel 140 is positioned towards the front of the vehicle, as shown in FIG. 11, separated rings 144, tension wheel shaft hub 143 and the first half 141 of tension wheel 140 are hand-tightened together.

Figure 12:
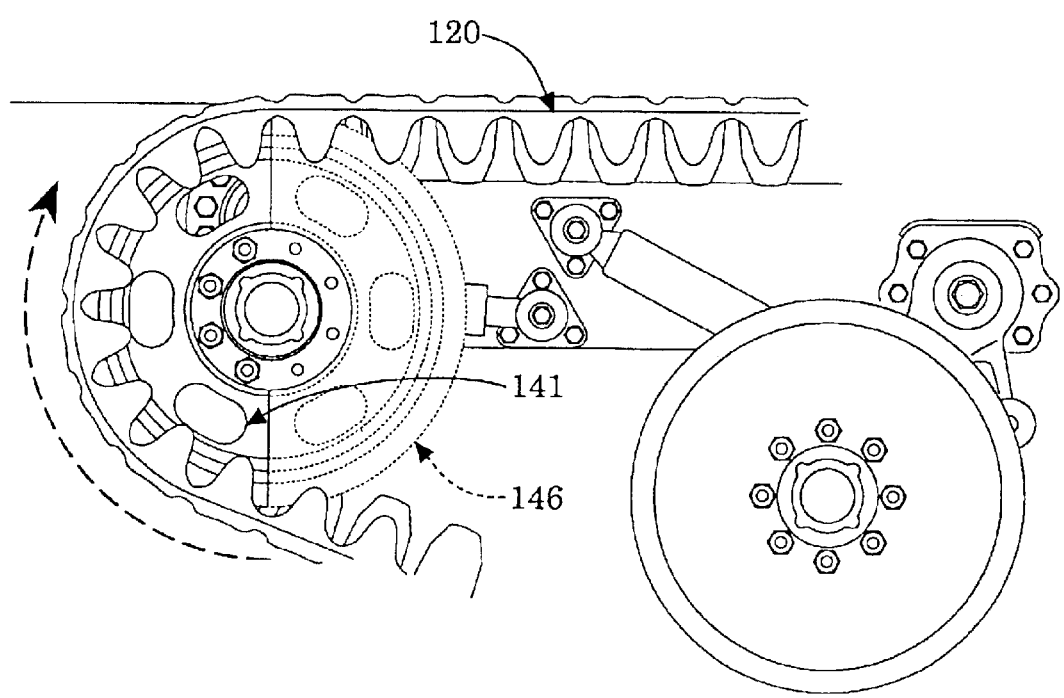
FIG. 12 is a partial side view showing the first section of the tension wheel being rotated.
Figure 13:
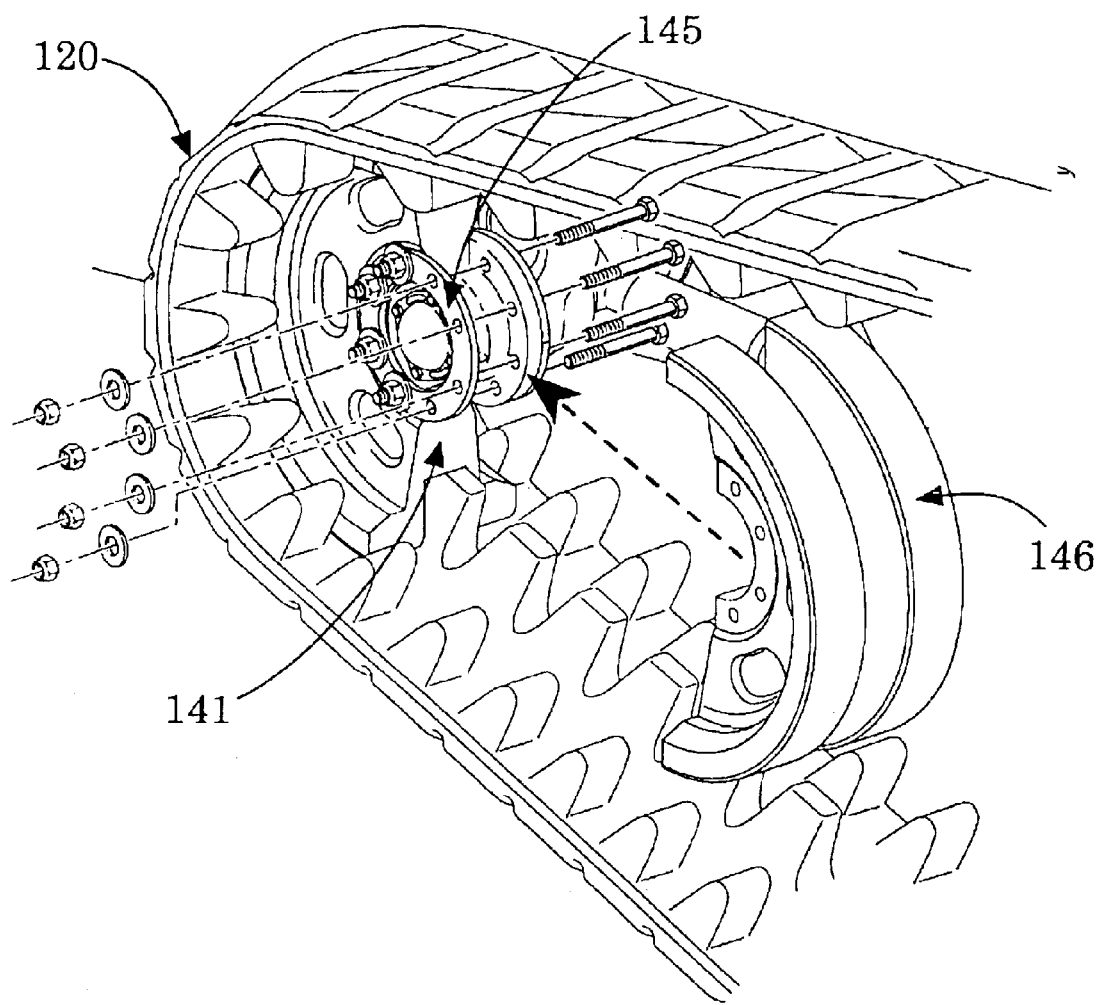
FIG. 13 is a perspective view of the second section of the tension wheel being installed.

As illustrated in FIG. 12, the rotation of the first half 141 of tension wheel 140, induced by moving the vehicle forward (with engine power), offers space provision for the installation of the second half 146 of tension wheel 140 and simultaneously provides greater tension to the rubber track 120 along the process. FIG. 13 shows the final tension wheel assembly on the vehicle 100 with the addition of the second half 146 of tension wheel 140 and a full ring 145 positioned on the outermost face of the tension wheel assembly, thus ensuring a complete tightened clamping system.

Figure 14:
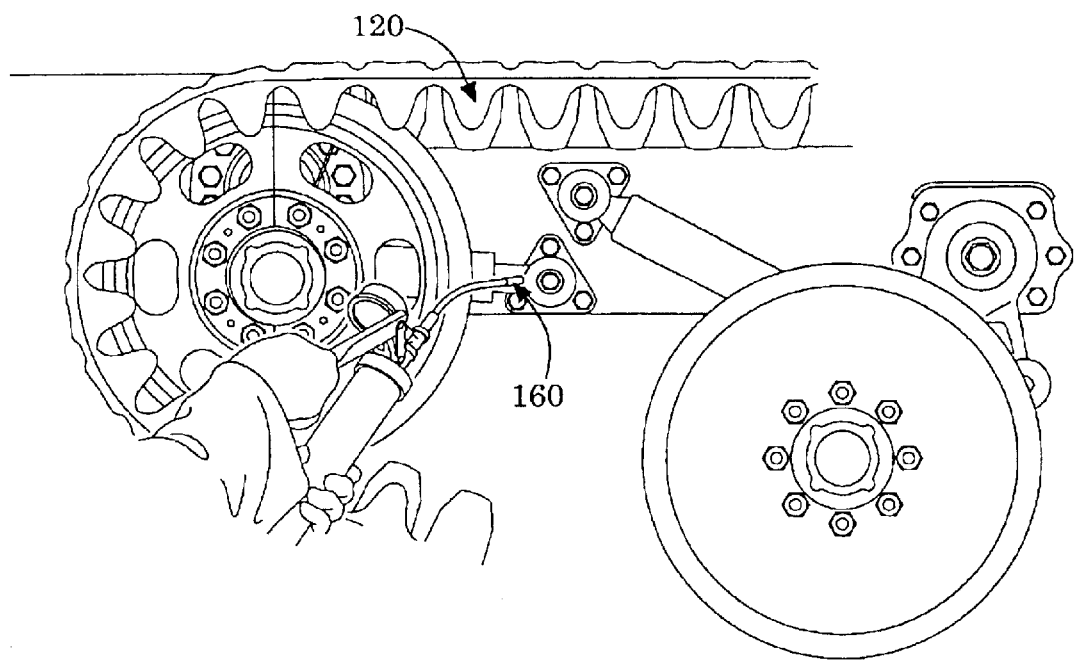
FIG. 14 is a partial side view of the tension wheel area on which pressure is applied on the tension wheel cylinder.

Finally, the rubber track 120 is preferably tensioned to a greater degree, by applying pressure to the tensioning system 160, as shown in FIG. 14.

Figure 15:
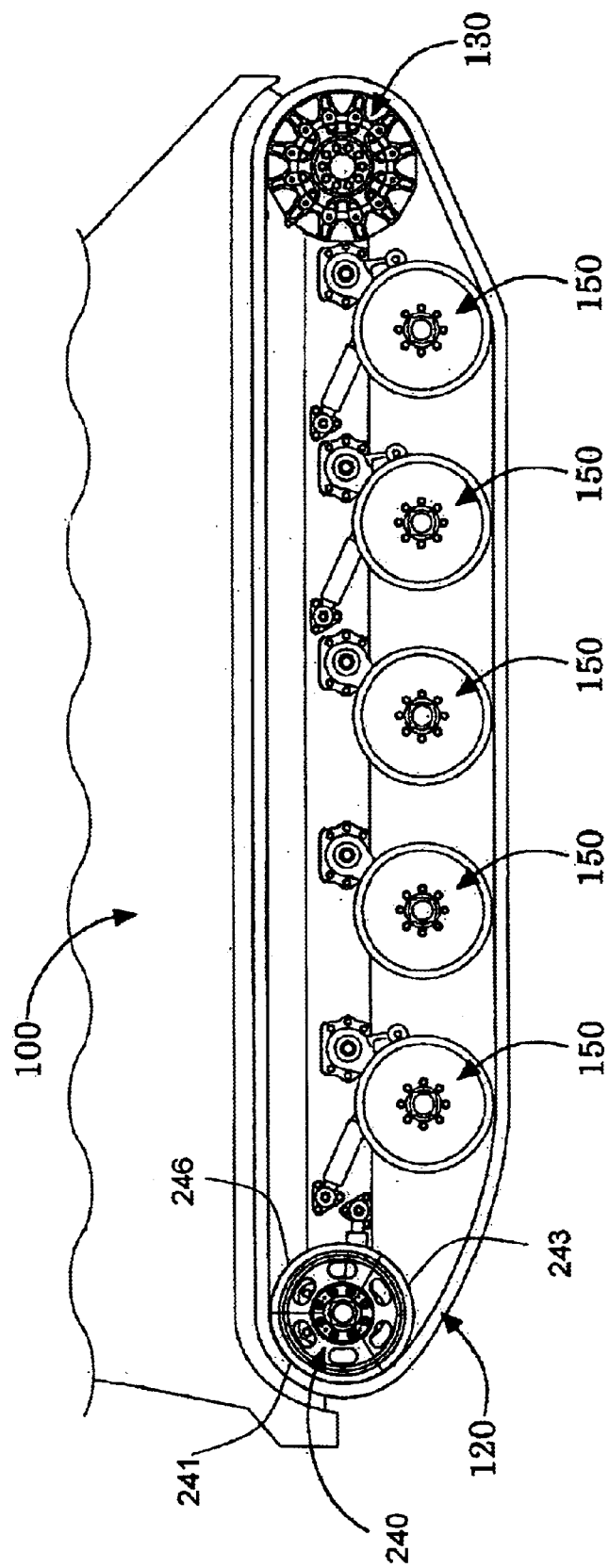
FIG. 15 is a partial side view of a tracked vehicle making use of a split tension wheel according to another embodiment of the invention.

According to another embodiment shown in FIG. 15, the split wheel 240 further comprises a third section 243 defining still another angular portion of said circumference and which complements the first section 241 and the second section 246.

The same step by step method is also applicable for the installation of the endless track with a split tension wheel on the other side of the vehicle 100.

While a preferred embodiment of the invention has been described herein, it should be apparent to those skilled in the art that variations and modifications are possible without departing from the spirit of this invention.

What is claimed is:

1. A split sprocket wheel for use with an endless track, comprising:
   a first section defining an angular portion of the circumference of said wheel and
   a second section defining another angular portion of said circumference;
   said first section and said second section being configured such that said first section may be fastened to a supporting shaft separately from the second section.

2. A split sprocket wheel as claimed in claim 1, wherein said second section may also be fastened to said supporting shaft.

3. A split sprocket wheel as claimed in claim 1, wherein said second section may be fastened to said first section.

4. A split sprocket wheel as claimed in claim 1, further comprising a third section defining still another angular portion of said circumference.

5. A split sprocket wheel as claimed in claim 1, wherein said second section is identical to said first section.

6. A split sprocket wheel for use with an endless track, comprising:
   a first section defining an angular portion of the circumference of said wheel and
   a second section defining another angular portion of said circumference;
   said first section and said second section being configured such that said first section may be fastened to a supporting shaft without said second section being fastened to said supporting shaft.

7. A method of installing an endless track on a tracked vehicle equipped with a plurality of wheels and a split wheel, said split wheel comprising a first section which defines an angular portion of the circumference of said split wheel and a second section which defines another angular portion of said circumference;
   said method comprising the steps of:
   a) insuring said split wheel is removed from the said vehicle;
   b) placing said endless track over said plurality of wheels;
   c) installing said first section on the vehicle such that said angular portion of the circumference faces away from said endless track;
   d) rotating said first section such that said angular portion of the circumference faces said endless track, to tension said endless track around said plurality of wheels and said first section,
   e) installing said second section on said vehicle.

8. A method of installing an endless track on a tracked vehicle equipped with a drive sprocket, a plurality of road wheels and a split tension wheel comprising a first section which defines an angular portion of the circumference of said tension wheel and a second section which defines another angular portion of said circumference;
   said method comprising the steps of:
   a) insuring said tension wheel is removed from the said vehicle;
   b) placing said endless track over said drive sprocket and the plurality of said road wheels;
   c) installing said first section on the vehicle such that said angular portion of the circumference faces away from said endless track;
   d) rotating said first section such that said angular portion of the circumference faces said endless track, to tension said endless track around said drive sprocket, said plurality of road wheels and said first section;

e) installing said second section on said vehicle.

9. A method of installing an endless track on a tracked vehicle equipped with a tension wheel, a plurality of road wheels and a split drive sprocket comprising a first section which defines an angular portion of the circumference of the said drive sprocket and a second section which defines another angular portion of said circumference;

said method comprising the steps of:
a) insuring said drive sprocket is removed from the said vehicle;
b) placing said endless track over said tension wheel and the plurality of said road wheels;
c) installing said first section on the vehicle such that said angular portion of the circumference faces away from said endless track;
d) rotating said first section such that said angular portion of the circumference faces said endless track, to tension said endless track around said tension wheel, said plurality of road wheels and said first section;
e) installing said second section on said vehicle.

10. A split tension wheel for use with an endless track, comprising:

a first section defining an angular portion of the circumference of said wheel and a second section defining another angular portion of said circumference;

said first section and said second section being configured such that said first section may be fastened to a supporting shaft separately from the second section.

11. A split tension wheel as claimed in claim 10, further comprising a third section defining still another angular portion of said circumference.

12. A split tension wheel as claimed in claim 10, wherein said second section is identical to said first section.

13. A split tension wheel as claimed in claim 10, wherein said second section may also be fastened to said supporting shaft.

14. A split tension wheel as claimed in claim 10, wherein said second section may be fastened to said first section.

15. A split tension wheel for use with an endless track, comprising:

a first section defining an angular portion of the circumference of the said wheel and a second section defining another annular portion of said circumference;

said first section and said second section being configured such that said first section may be fastened to a supporting shaft without said second section being fastened to said supporting shaft.

16. A method of installing an endless track on a tracked vehicle equipped with a plurality of wheels and a split wheel, said split wheel comprising a first section which defines an angular portion of the circumference of said split wheel and a second section which defines another angular portion of said circumference;

said method comprising the steps of:
a) insuring said second section is removed from said vehicle;
b) installing said first section on the vehicle such that said angular portion of the circumference faces away from said endless track;
c) placing said endless track over said plurality of wheels;
d) rotating said first section such that said angular portion of the circumference faces said endless track, to tension said endless track around said plurality of wheels and said first section;
e) installing said second section on said vehicle.

* * * * *